United States Patent Office 3,363,225
Patented Jan. 9, 1968

3,363,225
RANGING APPARATUS
William E. Currie and Paul M. Mettert, Seattle, Wash., assignors to Honeywell Inc., a corporation of Delaware
Filed Dec. 29, 1964, Ser. No. 421,911
2 Claims. (Cl. 340—3)

This invention relates to sonar echo sounding apparatus and particularly concerns sonar apparatus for obtaining an accurate profile of the bottom of a river channel or other body of water.

Depth finding using sonar ranging techniques is old. This technique involves transmitting an acoustical beam of energy toward the surface to be ranged and timing a return echo reflected from the surface. The time is proportional to range.

Usually, extreme accuracy has not been necessary in the past and the leading edge of the return echo has been detected. In a sonar ranging apparatus used for profiling a surface wherein the profile must be relatively accurate, the range along the beam center line must be obtained. The leading edge of the return echo does not correspond to the center of the beam but rather corresponds to an edge of the beam. The peak of the return echo pulse corresponds to the beam center line so it is the peak which must be detected if accurate profiling is to result. Amplitude detection of the peak also results in errors. Accordingly, it is an object of this invention to provide a sonar profiling apparatus wherein the rate of change of the return pulse is detected and a mark pulse is produced corresponding to a time when the slope of the echo pulse is substantially zero.

Other objects and advantages of this invention will further become apparent hereinafter and in the drawings, in which.

Figure 1:
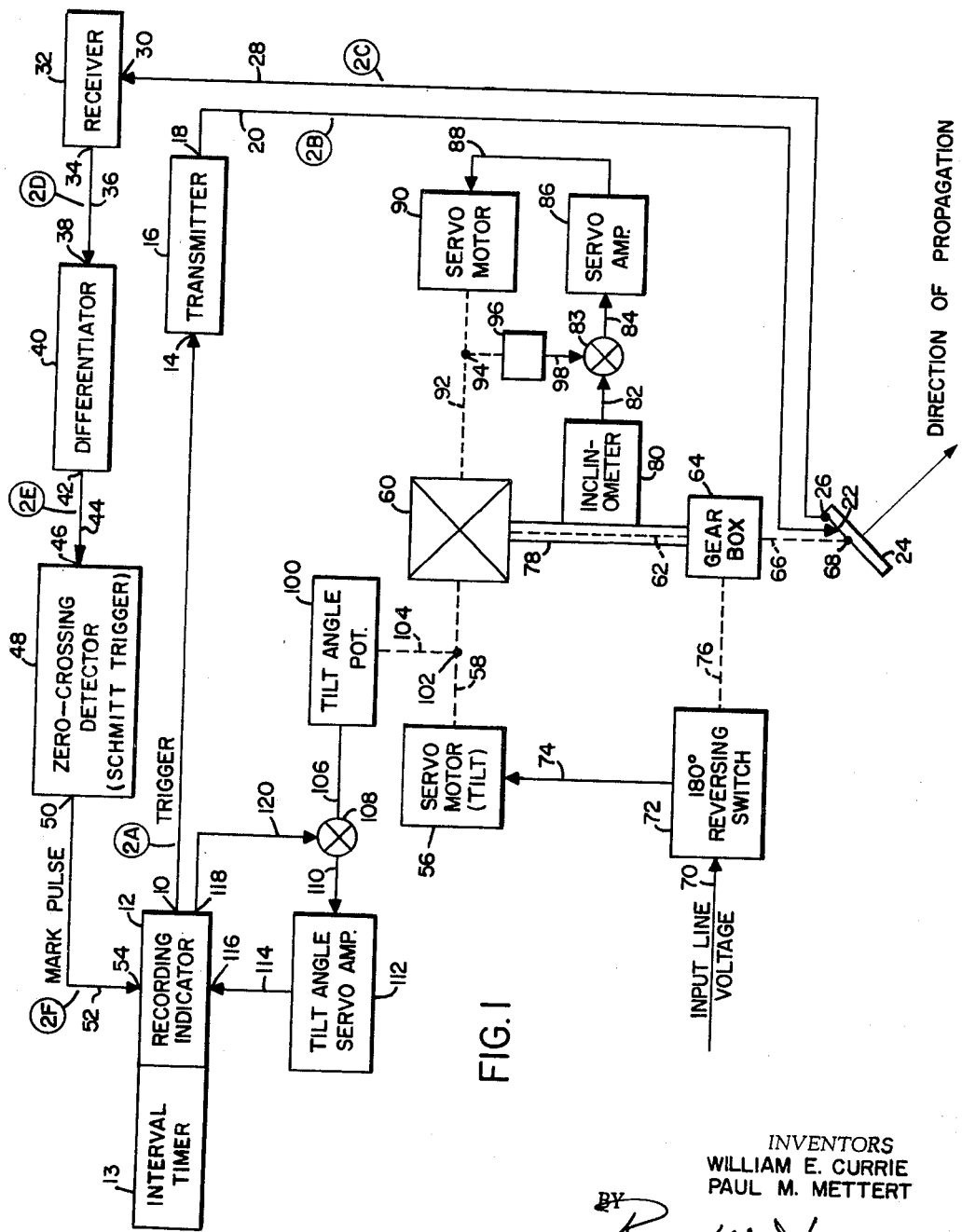
FIGURE 1 is a block diagram of a sonar profiling apparatus.

In describing the embodiment of the invention illustrated in the drawing, specific terminology will be used for the sake of clarity. However, it is not intended to be limited to these specific terms so selected, and it is to be understood that each specific term includes all technical equivalents which operate in a similar manner to accomplish a similar purpose.

Figure 2:
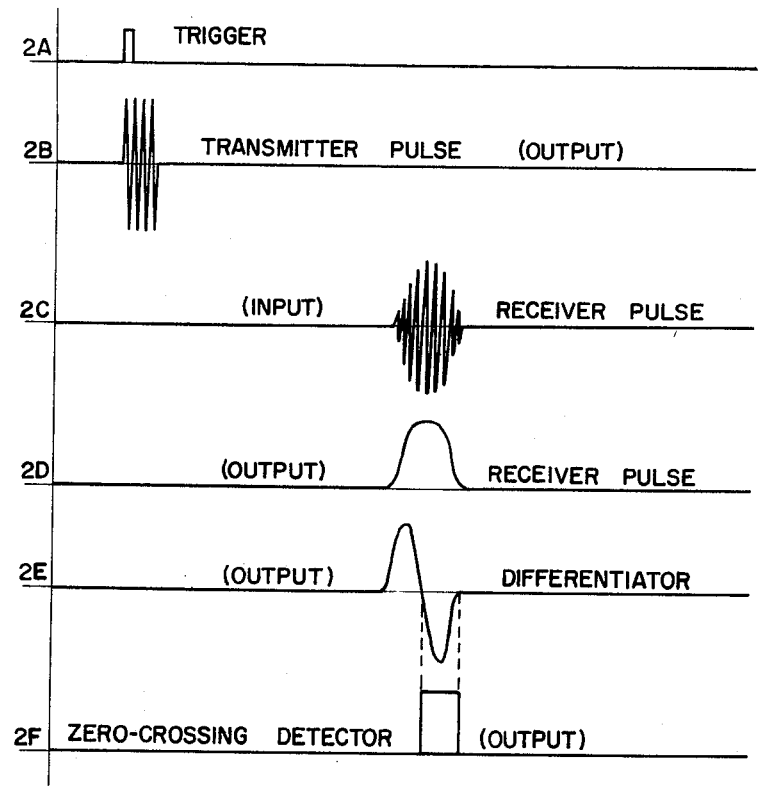
FIGURE 2 depicts a series of waveforms appearing at various points in the schematic diagram of FIGURE 1.

In FIGURE 1 a trigger pulse, shown as waveform 2A in FIGURE 2, is produced at an output terminal 10 of a recording indicator 12, which includes an interval timer 13, and is fed to an input terminal 14 of a transmitter 16. The trigger pulse starts the interval timer 13. A radio frequency pulse, shown as waveform 2B in FIGURE 2, synchronized with the trigger, is produced at output terminal 18 of transmitter 16 and is conducted on line 20 to an input terminal 22 of sonar transducer 24. Transducer 24 converts the R-F energy impressed at input terminal 22 to acoustical energy which is formed into a narrow beam and transmitted at right angles to the plane of transducer 24. Acoustic echoes reflected from a surface (not shown) are converted by transducer 24 into electrical pulses which appear at an output terminal 26 of transducer 24. From terminal 26 the electrical pulses are conducted along line 28 to an input terminal 30 of a receiver 32. The pulse on line 28, which is shown as waveform 2C in FIGURE 2, is amplified, rectified, and detected in receiver 32 and appears at an output terminal 34. The output at terminal 34 has a form similar to that shown in waveform 2D in FIGURE 2. The output appearing at terminal 34 of receiver 32 is transmitted on line 36 to an input terminal 38 of a differentiator 40. The differentiator may take many forms, the most common form being a series RC network with the output being developed across the resistor. The output appearing at an output terminal 42 of differentiator 40, shown in waveform 2E in FIGURE 2, is conducted on line 44 to an input terminal 46 of a zero crossing detector 48. The zero crossing detector produces a pulse simultaneously with the zero potential crossing point of the input waveform. A circuit such as a Schmitt trigger may be used for the zero crossing detection function. An example of a Schmitt trigger is shown in a textbook entitled, Semiconductor Devices and Applications, R. A. Greiner, page 396, published by McGraw-Hill, 1961. A Schmitt trigger circuit produces an output pulse of constant amplitude only as long as the input voltage exceeds (or is less than) a certain value. The output pulse at output terminal 50 of zero crossing detector 48 has a shape as shown in waveform 2F of FIGURE 2. It is centered on the negative portion of waveform 2E and begins at the zero crossing point of that waveform. This pulse is conducted along line 52 to an input terminal 54 of the recording indicator 12. The output pulse produced by the zero crossing detector is called the mark pulse. The mark pulse also stops the interval timer 13.

Mechanical energy used to tilt the transducer 24 about an axis perpendicular to the plane of the drawing is produced by a servo-tilt motor 56. Mechanical connecting means, shown as a dashed line 58, connects the output of servomotor 56 to one input of a differential drive unit 60. A mechanical connecting means, shown as dashed line 62, connects the mechanical output of the differential drive 60 to a gear box 64 which includes means for driving transducer 24 at the proper speed and about the aforementioned axis. The mechanical output of gear box 64 is connected to a point 68 on transducer 24 by a mechanical connecting means shown as dashed line 66. Electrical energy for the servomotor 56 is present on a line 70 which is connected to a 180° reversing switch 72 which in turn is connected to servomotor 56 by a conductor 74. Mechanical connecting means, shown as dashed line 76, connects gear box 64 to reversing switch 72. The purpose of the reversing switch is to reverse the polarity of the input line voltage for approximately every 180° of rotation of transducer 24, which reverses motor 56 thereby enabling transducer 24 to be swept periodically through 180°. A rigid drive frame 78 encloses mechanical connecting means 62 and rigidly fixes gear box 64 in space with respect to differential 60. An inclinometer 80 is fastened to drive frame 78 and produces an electrical output, dependent upon the tilt angle of drive frame 78, on an output line 82. Line 82 is connected to a summing point 83 in turn is connected by means of a line 84 to the input of a servoamplifier 86. The output of servoamplifier 86 is connected by means of a conductor 88 to the input of a servomotor 90. Mechanical means shown as a dashed line 92 connects the mechanical output of servomotor 90 to a second input of the differential drive 60. From a point 94 on mechanical connecting means 92, mechanical connection is made to a follow-up pot 96. The output of follow-up pot 96 is conducted on line 98 to the summing point 83 joining lines 82 and 84. A tilt angle potentiometer 100 is connected to a point 102 on the mechanical connecting means 58 by a mechanical means shown as a dashed line 104. The electrical output of the tilt angle potentiometer 100 appears on a conductor 106 which terminates at a summing point 108. A conductor 110 connects summing point 108 to the input of a tilt angle servoamplifier 112 which in turn has an electrical output which is conducted along conductor 114 to an input terminal 116 of the recording indicator 12. Input terminal 116 is connected to a servomotor (not shown) which is connected to an arm (not shown) in recording indicator 12. A follow-up signal is developed at output terminal 118 of recorder 12 and fed to summing point 108 via line 120.

Recording indicator 12 is of a form generally shown in a patent to W. N. Ross, No. 2,759,783, filed Mar. 10, 1952, and assigned to the assignee of the present invention. Although Ross shows a selsyn link for synchronizing the arm of the recorder with the transducer, use of a servo follow-up system as described above would occur to persons familiar with the problem.

Figure 3:
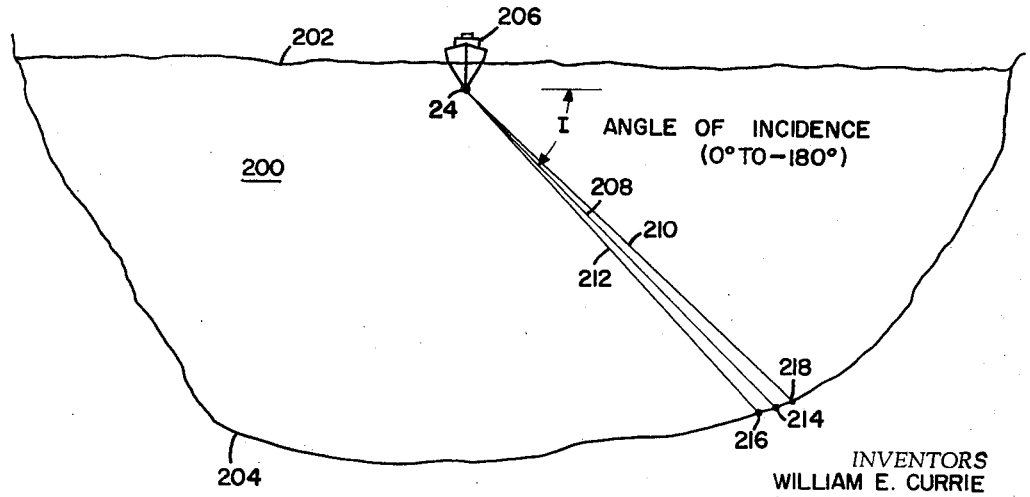
FIGURE 3 is a cross-ectional view of a river channel showing the general profiling operation involved.

FIGURE 3 depicts a river channel 200 having a surface 202 and a bottom contour represented by an irregular line 204. Floating near the center of the river channel 200 is a boat 206 having transducer 24 mounted on the keel. A narrow beam of acoustical energy is shown being emitted from transducer 24. The center line of the beam is represented by a ray 208 and the edges of the beam are represented by rays 210 and 212. As the acoustical beam nears the bottom contour line 204, it spreads out and intercepts the contour line 204 at points 216, 214 and 218 corresponding with rays 212, 208, and 210 respectively. Because the acoustic beam of energy spreads during transmission, the return or reflected pulse of acoustic energy that is received by transducer 24 is relatively flat, i.e., has a slow rate of change. The pulse is relatively wide because the distance traversed by the energy along ray 212 is substantially shorter than the path the acoustic energy traverses along ray 210. The width of the return pulse is generally increased as the angle of incidence, I, which the beam makes with the horizontal decreases to zero or increases to −180°. As shown in FIGURE 3, the acoustical beam is swept in the plane of the drawing. The beam is swept from the zero degree position to the −180° position and back again from the −180° position to the zero position.

In operation, a trigger pulse is produced by the recording indicator 12 that energizes transmitter 16, producing a radio frequency pulse which is converted by the transducer 24 and emitted therefrom in the form of a narrow beam of acoustic energy in a direction of propagation perpendicular to the plane of transducer 24. The tilt angle assumed by transducer 24 is transmitted to the recording indicator so that the recording indicator may be synchronized with the tilt angle of the transducer 24 by the tilt angle pot 100. The output of the tilt angle pot is used to drive servoamplifier 112 which has an output that is used to drive a servo in the recorder indicator 12. The servo in recording indicator 12 is used to drive an arm therein that is synchronized with the transducer 24. Attached to the arm is a device such as a follow-up pot that provides a signal at the output terminal 118 of recording indicator 12. The signal is transmitted along line 120 to the summing point 108 and is used to balance the loop comprising potentiometer 100, servoamplifier 112, a servo in recorder 112, a follow-up device on the arm of the recorder 12, and summing point 108.

The transducer is stabilized in the roll axis of the ship by a loop including the inclinometer 80, summing point 83, a servo amplifier 86, servomotor 90 and follow-up pot 96. As the ship to which the transducer is mounted rolls, a signal is produced by the inclinometer 80 and impressed across the input of a servoamplifier 86. The output of the servoamplifier is used to drive the servomotor 90 which provides a mechanical input to the differential drive unit 60, causing transducer 24 to move and which also provides a mechanical drive to a follow-up pot 96 which is used to rebalance the loop. In the same manner, if it is necessary, stabilization in the pitch axis may be accomplished.

Although detector 48 has been called a zero crossing detector, it is not necessary that the zero crossing of the input waveform be detected. It may be advantageous to detect a point in time slightly before the zero crossing point, and in order to do this, it is merely necessary to bias the zero crossing detector properly so that detection takes place at the aforementioned earlier point.

Rather than using a type of recording indicator 12 which is generally described in the aforementioned reference (Ross patent), it may be advantageous to use an interval timer such as a digital indicator that is started when the trigger pulse occurs and which is stopped when the mark pulse is produced. This may take the form of a digital counter, the count in the digital counter representing the slant range to the bottom of a river channel. Proper corrections involving a cosine function and the depth of the transducer below the surface of the river channel can be incorporated in the digital indicating apparatus to provide a true depth indicator.

It is to be understood that the form of the invention herewith shown and described is to be taken as but one embodiment. Various changes may be made in the arrangement of the basic components as disclosed in FIGURE 1. For example, equivalent components may be substituted for those illustrated and described herein, and certain features of the invention may be utilized independently of the use of other features, all without departing from the spirit and scope of the invention as defined in the appended claims.

Having thus described our invention, we claim:

1. Sonar profiling apparatus comprising, in combination: a transmitter having output means across which is developed a series of periodic pulses of electrical energy; transducer means connected to said transmitter output means, electrically driven by said transmitter, developing acoustic energy corresponding to said electric energy, directing a relatively narrow beam of acoustic energy toward the bed of a body of water, receiving acoustic energy reflected from the bed, and converting the received acoustic energy to a corresponding electric energy signal; actuating means connected to mechanically drive said transducer in a predetermined plane; a receiver having a signal input means connected to be energized by the reflected signal developed by said transducer and having a signal output means across which a pulse signal corresponding to the acoustic energy reflected from said bed is developed; a differentiator having a signal input means and output means, the input means connected to the receiver output means, said differentiator developing a signal at its output means representing the slope of the input signal, said slope changing polarity when a signal peak is traversed; a level detector having a signal input means connected to the differentiator output means, and an output means across which there is developed an output signal pulse of constant amplitude only as long as the input signal to the detector is less than a predetermined level; and, a recorder having a signal input means connected to be energized by the output means of said detector, said recorder synchronized with said transmitter and said transducer means and providing a linear time scale that is marked whenever said detector provides a signal to the recorder input means.

2. Sonar profiling apparatus comprising, in combination: a transmitter having output means across which is developed a series of periodic pulses of electrical energy; transducer means connected to said transmitter output means, electrically driven by said transmitter, developing acoustic energy corresponding to said electric energy, directing a relatively narrow beam of acoustic energy toward the bed of a body of water, receiving acoustic energy reflected from the bed, and converting the received acoustic energy to a corresponding electric energy signal; actuating means connected to mechanically drive said transducer in a predetermined plane; a receiver having a signal input means connected to be energized by the reflected signal developed by said transducer and having a signal output means across which a pulse signal corresponding to the acoustic energy reflected from said bed is developed; a differentiator having a signal input means and output means, the input means connected to the receiver output means, said differentiator developing a signal at its output means representing the slope of the input signal, said slope changing polarity when a signal peak is traversed; a level detector having a signal input means connected to the differentiator output means, and an output means across which there is developed an output signal pulse of constant amplitude only as long as the input signal to the detector is greater than a predetermined level; and, a recorder having a signal input means connected to be energized by the output means of said detector, said recorder synchronized with said transmitter and said transducer means and providing a linear time scale that is marked whenever said detector provides a signal to the recorder input means.

References Cited

UNITED STATES PATENTS

| | | | |
|---|---|---|---|
| 2,448,718 | 9/1948 | Koulicovitch | 328—150 |
| 2,557,869 | 6/1951 | Gloess | 343—11 |
| 2,780,795 | 2/1957 | Ambrosio | 340—3 |
| 2,825,884 | 3/1958 | Fryklund | 340—3 |
| 3,201,704 | 8/1965 | Lindsey | 328—150 |
| 3,207,988 | 9/1965 | Gerardin | 325—323 |
| 3,197,770 | 7/1965 | Rix et al. | 343—7 |
| 3,212,055 | 10/1965 | Grieg | 340—1 X |
| 3,268,892 | 8/1966 | Atlas | 343—5 |

OTHER REFERENCES

Sarbacher: "Encyclopedic Dictionary of Electronics and Nuclear Engineering," Prentice-Hall, Inc., 1959, page 1153 relied on.

RICHARD A. FARLEY, *Primary Examiner.*

RODNEY D. BENNETT, CHESTER L. JUSTUS, *Examiners.*